United States Patent Office 3,075,370
Patented Jan. 29, 1963

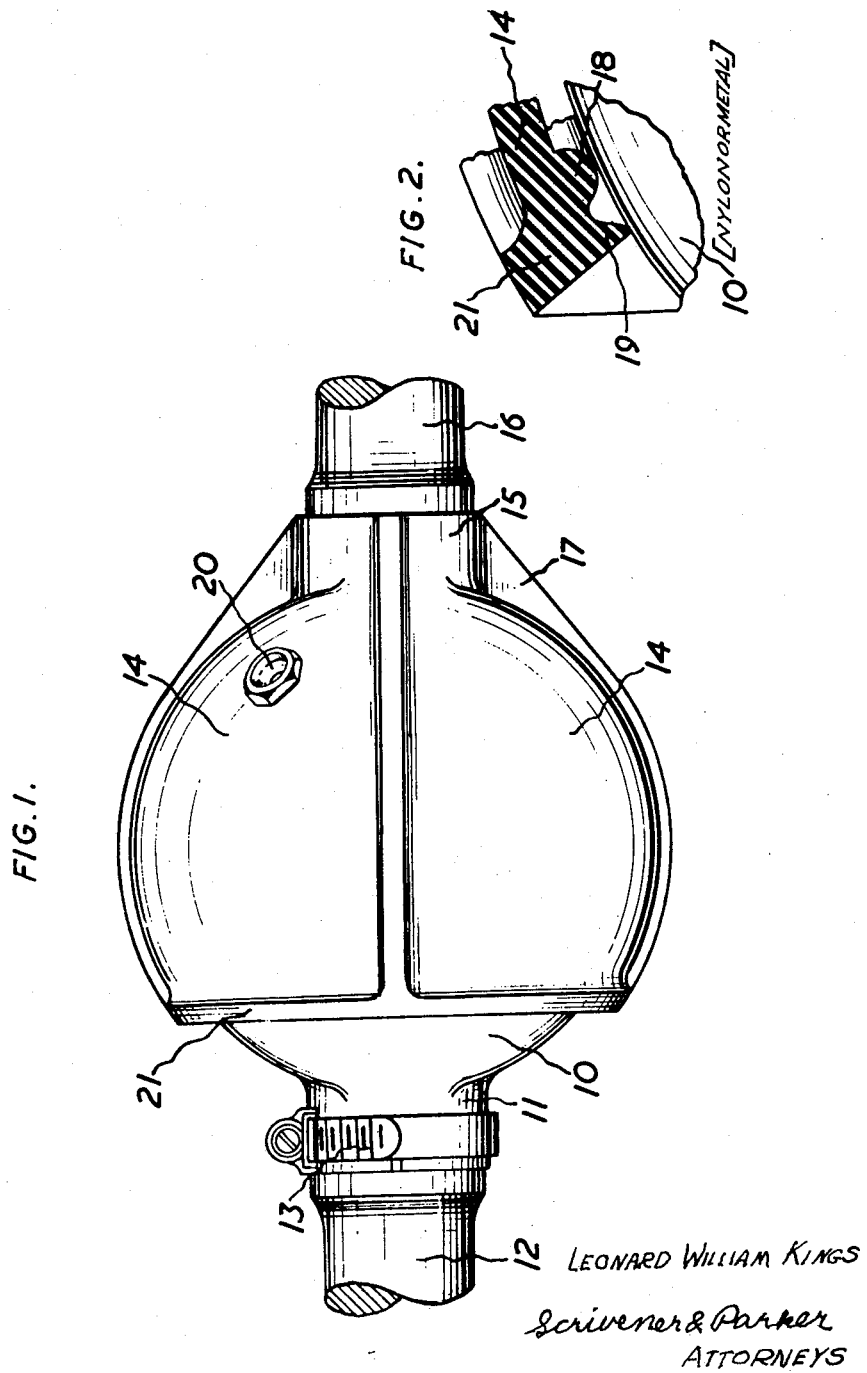

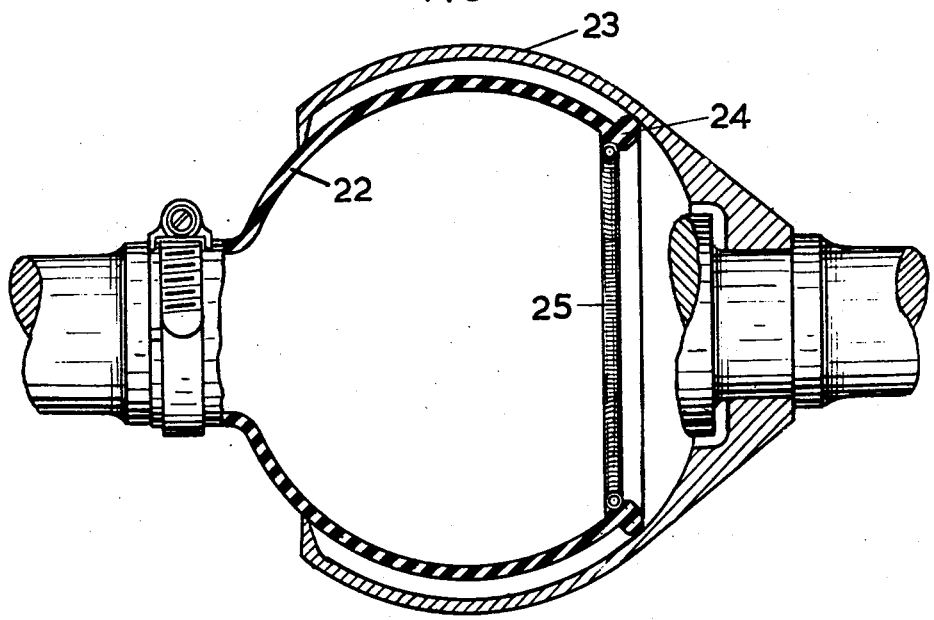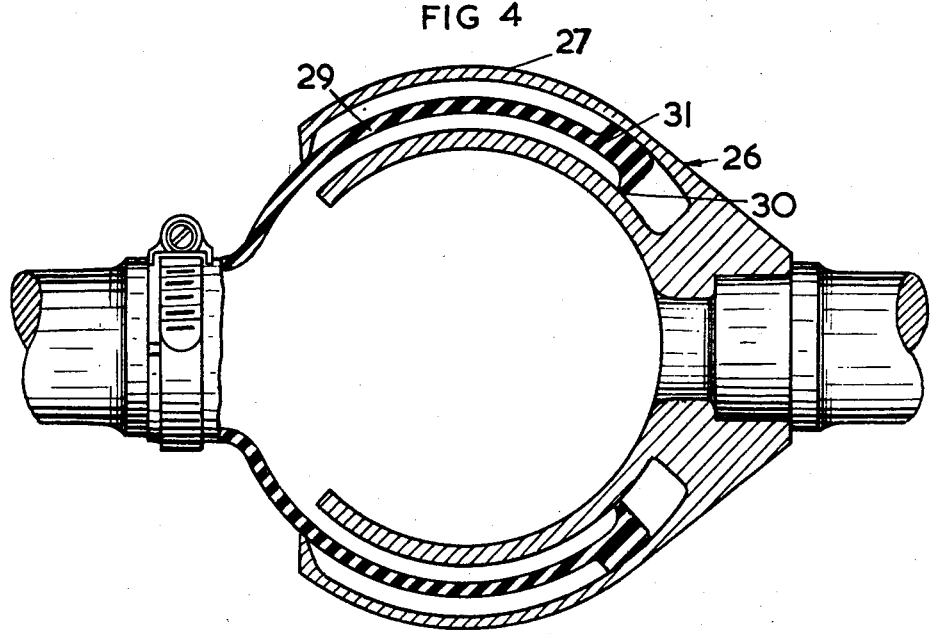

3,075,370
UNIVERSAL JOINTS
Leonard William Kings, Leamington Spa, England, assignor to Girling Limited, Birmingham, England, a British company
Filed Jan. 16, 1961, Ser. No. 83,103
9 Claims. (Cl. 64—32)

This invention relates to improvements in universal joints such as are used for drivably coupling shafts of which the axes intersect but of which the alignment may vary.

It is usual practice, particularly in vehicle transmission, to enclose a universal joint in a spherical protective housing, but such housings generally incorporate complicated and expensive spherical components and oil seals or wiper seals, depending on whether or not the housing is filled with oil. In some cases, a universal joint which is not oil immersed is enclosed by a flexible rubber or like bellows, but where the joint is part of the drive to a front wheel of a vehicle, the bellows must be large and cumbersome to accommodate the necessary movement, and rubber bellows are liable to fatigue failures.

According to our invention, a housing for a universal joint comprises two co-operating part-spherical cup members of which one is formed of a relatively rigid material and the other is formed of a relatively resilient material, a lip or equivalent seal, which may be an integral part of the member, being provided on one member for engagement with the inner or outer surface of the other member to exclude foreign matter and to retain lubricant if required.

The outer ends of the members are secured in any convenient manner to the two elements of the joints.

The relatively rigid member of the housing may be formed of metal or of a plastic such as nylon, while the relatively resilient member may be formed of rubber or of a plastic having similar physical characteristics to allow it to be fitted over or inserted into the rigid member.

One form of housing in accordance with our invention for a universal joint is illustrated by way of example in the accompanying drawings in which:

FIGURE 1 is a side elevation of the housing;
FIGURE 2 is a fragmentary section on a larger scale of the seal between the two parts of the housing;
FIGURE 3 is a vertical cross-sectional view of a modified housing; and
FIGURE 4 is a vertical cross-sectional view of yet another modified housing.

In the housing illustrated, one part comprises a part-spherical cup member 10 formed of metal or of a plastic such as nylon, and having an integral axially extending sleeve part 11 which fits over a shaft element 12 of the universal joint and is secured in position by a worm-drive clip 13. If the member is made of metal, the sleeve part 11 may be split to allow it to be contracted on to the shaft. The cup member 10 may conveniently have the form of approximately half a sphere.

The other member 14 is moulded from rubber or a plastic having similar physical characteristics and has the form of approximately three-quarters of a sphere. This member has an integral axially extending sleeve part 15 which fits over the other shaft element 16 of the universal joint and the member may be strengthened or stiffened by external ribs 17. The internal radius of the member 14 is substantially equal to the external diameter of the cup member 10 and the material of which the member 14 is made is sufficiently resilient to allow its open end to be stretched to fit it over the cup member 10. The member 14 is formed on its inner surface around the open end with a lip or the like adapted to bear on the surface of the cup member 10 to form a seal for retaining lubricant.

Preferably, as shown in FIGURE 2, the seal comprises an annular rib 18 with a convex surface spaced a short distance from the end of the member and a sharp-edged annular lip 19 which acts as a scraper and prevents the passage into the housing of grit or other foreign matter on the exposed surface of the cup member 10.

A port 20 for the introduction of lubricant into the housing is formed in the member 14.

The peripheral edge of the open end of the member 14 may be reinforced by an external rib 21.

In an alternative construction shown in FIGURE 3, in which the relatively resilient member 22 fits within the rigid member 23, the resilient member has a sealing lip or rib 24 on its outer surface which engages with the inner surface of the rigid member. In that case an expanding garter spring 25 may be fitted within the resilient member to improve the efficiency of the seal. This arrangement has the advantage that the seal is protected against damage by flying stones and the like, and the resilient member itself is protected by the rigid member.

In a modification shown in FIGURE 4 the rigid member 26 may be formed by two concentric part-spherical shells 27, 28 with a narrow space between them into which the resilient member 29 fits. In that arrangement there may be a fine or narrow lip seal 30 between the resilient member and the inner shell, and a relatively wide seal 31 between it and the outer shell.

I claim:

1. A housing for a universal joint for drivably coupling two shafts of which the axes intersect, comprising a rigid substantially hemi-spherical hollow member and a resilient member having the form of approximately three-quarters of a hollow sphere of an internal diameter substantially equal to the external diameter of said rigid member which fits within said resilient member, said resilient member having at its open end two spaced internal annular sealing ribs adapted to engage the outer surface of said rigid member.

2. A housing for a universal joint for drivably coupling two shafts of which the axes intersect said housing comprising interengaging first and second part-spherical open-ended shell-like members having a common centre, said second member fitting over and partially enclosing said first member and having an internal radius of curvature substantially equal to the external radius of curvature of said first member, whereby said members can perform relative angular sliding movements about said common centre, said second member having an open end of smaller diameter than the greatest diameter of said first member, and each of said members having an unbroken periphery and at least said second member being adapted at its end remote from its open end, to engage its associated shaft and at least one of said first and second members being made of resilient material allowing it to be deformed for assembly together of said members.

3. A housing for a universal joint for drivably coupling two shafts of which the axes intersect, said housing comprising interengaging first and second part-spherical open-ended shell-like members having a common centre, said second member fitting over and partially enclosing said first member and having an internal radius of curvature substantially equal to the external diameter of said first member whereby said members can perform relative angular sliding movements about said common centre, said second member having an open end that is normally of smaller diameter than the greatest diameter of said first member and each of said members having an unbroken periphery, at least said second member being adapted to engage its associated shaft at its end remote from its open end, and said second member being made of resilient material such as to allow the periphery of said second member to be stretched to pass over said first member for assembly together of said two members.

4. A housing as in claim 3, wherein said first member is of sheet metal.

5. A housing as in claim 3, wherein said first member is of nylon.

6. A housing as in claim 3, wherein said second member is of rubber.

7. A housing for a universal joint for drivably coupling two shafts of which the axes intersect, said housing comprising interengaging first and second part-spherical open-ended shell-like members having a common centre, said second member fitting over and partially enclosing said first member and having an internal radius of curvature substantially equal to the external diameter of said first member whereby said members can perform relative angular sliding movements about said common centre, said second member having an open end that is normally of smaller diameter than the greatest diameter of said first member and each of said members having an unbroken periphery, at least said second member being adapted to engage its associated shaft at its end remote from its open end, and said first member being made of resilient material such as to allow the periphery of said first member to be deformed to pass into the open end of said second member for assembly together of said two members.

8. A housing as in claim 7, wherein said first member includes an expanding garter spring.

9. A housing for a universal joint for drivably coupling two shafts of which the axes intersect, said housing comprising interengaging first and second part-spherical open-ended shell-like members having a common centre with the open ends of each of said members having a diameter less than the greatest diameters of said members, said first member comprising inner and outer concentric layers defining between them a spherical space, and said second member entering into the said space, whereby said members can perform relative angular sliding movements about said common centre, said first member having an open end that is normally of smaller diameter than the greatest diameter of the periphery of said second member, and each of said members having an unbroken periphery, at least said first member being adapted to engage its associated shaft at its end remote from said open end, the space in said first member having at the shaft engaging end thereof a diameter less than the greatest diameter of the periphery of said second member, and said second member being made of resilient material such as to allow the periphery of said second member to be deformed to pass through the opening of said first member and between the layers of said first member with the open end of said second member extending in the direction of the shaft receiving end of the spherical space of said first member and beyond the plane through the greatest diameter thereof for assembly together of said members.

References Cited in the file of this patent

UNITED STATES PATENTS

| | | |
|---|---|---|
| 1,665,734 | Clark | Apr. 10, 1928 |
| 1,902,976 | Spicer et al. | Mar. 28, 1933 |
| 2,008,830 | Johnson | July 23, 1935 |
| 2,079,622 | La Rose | May 11, 1937 |
| 2,847,837 | Baker | Aug. 19, 1958 |
| 2,929,232 | Muller | Mar. 22, 1960 |
| 2,944,442 | Muegel et al. | July 12, 1960 |
| 2,960,850 | Crawford | Nov. 22, 1960 |